M. LACHMAN.
METHOD OF PLUGGING HOLES IN METAL PLATES.
APPLICATION FILED OCT. 19, 1918.

1,332,670.

Patented Mar. 2, 1920.

INVENTOR
Maurice Lachman
BY
Townsend&Decker
ATTORNEYS

UNITED STATES PATENT OFFICE.

MAURICE LACHMAN, OF NEW YORK, N. Y., ASSIGNOR TO UNIVERSAL ELECTRIC WELDING COMPANY, OF NEW YORK, N. Y., A CORPORATION OF NEW YORK.

METHOD OF PLUGGING HOLES IN METAL PLATES.

1,332,670.  Specification of Letters Patent.  Patented Mar. 2, 1920.

Application filed October 19, 1918. Serial No. 258,854.

*To all whom it may concern:*

Be it known that I, MAURICE LACHMAN, a citizen of the United States, and a resident of New York, in the county of New York and State of New York, have invented certain new and useful Improvements in Methods of Plugging Holes in Metal Plates, of which the following is a specification.

My present invention relates to a method of plugging holes in metal plates particularly of such heavy gage as ship plates wherein it is necessary to have the plugged hole of practical uniform quality and strength with the imperforate part of the plate.

In ship building, the rivet holes in the plates are provided in the mill before shipment to the yard and it frequently happens that the holes when the plates are about to be assembled are found to be in the wrong place through numerous different causes. This requires that the holes be filled up and obviously the refilled hole should be as strong as other parts of the plate. The methods at present employed for accomplishing this refilling operation require considerable time and do not result in a uniformly strong plate.

The object of the present invention is to plug up the hole in a quick, efficient manner and attain a plate of uniform strength.

In carrying out the invention I employ a heating electric current derived from the secondary of a transformer as is done in the electric metal working and welding art to heat an insert located in the hole to be plugged and for this purpose any of the well known electric heating and welding apparatus of the resistance type may be employed.

The invention consists in the improved method of plugging holes in metal plates hereinafter more particularly described and then specified in the claims.

In the accompanying drawings, Figure 1 is a diagrammatic representation of an arrangement for carrying out the present invention.

1 indicates a metal plate such as a ship plate having a hole it is desired to fill up.

2 indicates a metal insert or plug of the same contour as the hole in the plate and adapted to fit the hole snugly when cold.

The insert or plug is passed through the hole and is left with its opposite ends projecting a short distance from opposite surfaces of the plate.

The work is placed between current supplying blocks or electrodes 3, 4 forming the opposite terminals of the secondary circuit of a transformer 5. The blocks are brought into contact with the projecting ends of the insert 2 and a current passed from one to the other through the insert in a manner well understood by those skilled in the electric welding art.

The passage of the current from one block to the other heats the insert midway between its ends and by continuing the current the middle part of the insert attains a welding heat and also causes the walls of the hole to rise to such heat by conduction. By applying pressure in any suitable, well known manner the blocks 3 and 4 are caused to approach each other and in so doing bulge out or upset the heated section of the insert laterally against the walls of the hole and cause a welding of the parts as indicated at 10 in Fig. 2.

Figure 1:
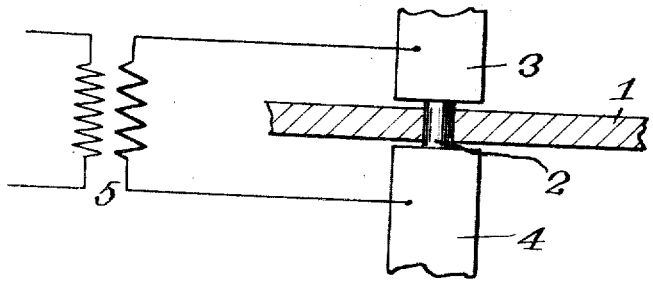
Figure 2:
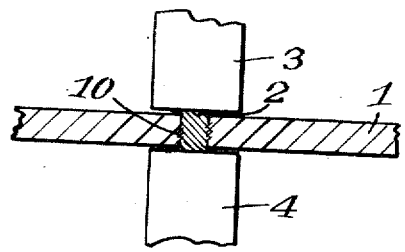
Fig. 2 is a similar view showing a subsequent stage in the operation.
Figure 3:
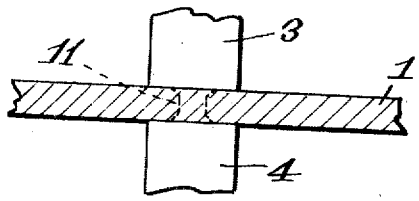
Fig. 3 is a similar view showing the completion of the final step in the process.

The continuation of the current causes the projecting ends of the insert to become heated and in applying the pressure these ends upset as indicated in Fig. 2 and mushroom over onto the outer surfaces of the plate 1. When this takes place, a larger path for the current is provided which then passes through the plate 1 as well as through the insert. This passage of the current causes the whole mass of the insert as well as the parts of the plate around the hole embraced by the mushroomed ends of the insert to become plastic and the pressure between the blocks coalesces the parts and welds them together into an integral mass, the blocks being pressed toward each other until they seat on the opposite surfaces of the plate. By this time the ends of the insert have become flush with the outer surfaces of the plate as indicated in Fig. 3.

In plugging a hole according to this invention it is impossible to observe the insert in the finished product even when the plate is cut or sawed directly through the plugged hole as the whole insert has become an integral part of the plate. In Fig. 3 the dotted lines 11 merely indicate how the insert has become embedded in the plate.

What I claim as my invention is:—

1. The method of plugging holes in metal plates, consisting in inserting a metal plug through a hole in a metal plate with its ends projecting from opposite sides, passing an electric current through the plug and applying pressure to weld the plug to the plate and at the same time mushroom the projecting ends onto the opposed surfaces of said plate and then flatten the mushroom parts flush with the opposite surfaces of the plate.

2. The method of plugging holes in metal plates, consisting in passing a metal insert through a hole in a metal plate with its ends projecting from opposite surfaces of the plate, contacting current supplying electrodes to said projecting ends, passing an electric current from one electrode to the other to heat the insert in the hole and applying pressure to weld the insert to the walls of the hole and at the same time mushroom the projecting ends over opposite surfaces of the plate and weld them to the plate flush with the outer surfaces thereof.

Signed at New York, in the county of New York and State of New York, this 18th day of October, A. D. 1918.

MAURICE LACHMAN.

Witnesses:
C. F. TISCHNER,
IRENE LEFKOWITZ.